United States Patent [19]

Tymkewicz

[11] 4,259,123

[45] Mar. 31, 1981

[54] THERMOCOUPLE PROBE-CONSTRUCTION AND MOUNTING

[76] Inventor: John Tymkewicz, c/o Marlin Mfg. Corp., 12404 Triskett Rd., Cleveland, Ohio 44111

[21] Appl. No.: 784,529

[22] Filed: Apr. 4, 1977

[51] Int. Cl.³ .............................................. H01J 35/28
[52] U.S. Cl. .................................................. 136/221
[58] Field of Search ..................... 136/221; 323/68, 95

[56] References Cited
U.S. PATENT DOCUMENTS

| | | | |
|---|---|---|---|
| 3,317,353 | 5/1967 | Bingham | 136/221 X |
| 3,573,995 | 4/1971 | Senbokuya | 136/221 |
| 3,681,990 | 8/1972 | Barrett et al. | 136/221 |
| 3,751,305 | 8/1973 | Huebscher | 136/221 |
| 3,939,012 | 2/1976 | Williams | 136/221 |

*Primary Examiner*—Leland A. Sebastian
*Attorney, Agent, or Firm*—Frank B. Robb

[57] ABSTRACT

There is disclosed electronic sensing means such as thermisters, RTD's, and thermocouples, which include a contact part at the extremity of conductor means and of plastic or like insulating material and of low mass and small dimension, in, on or over which sensing elements are arranged in a manner to provide extremely sensitive response to temperature conditions, contact of the part with a surface in an area of a member where temperature indication is desired being effected by resilient means which is insulated from such surface and thereby does not adversely affect the response. Pressure of such contact may be varied when a spiral wound spring is availed of to influence such contact and the spring may be connected to the part by molding an end thereof in such part, and the compression of such spring may in turn be varied.

7 Claims, 6 Drawing Figures

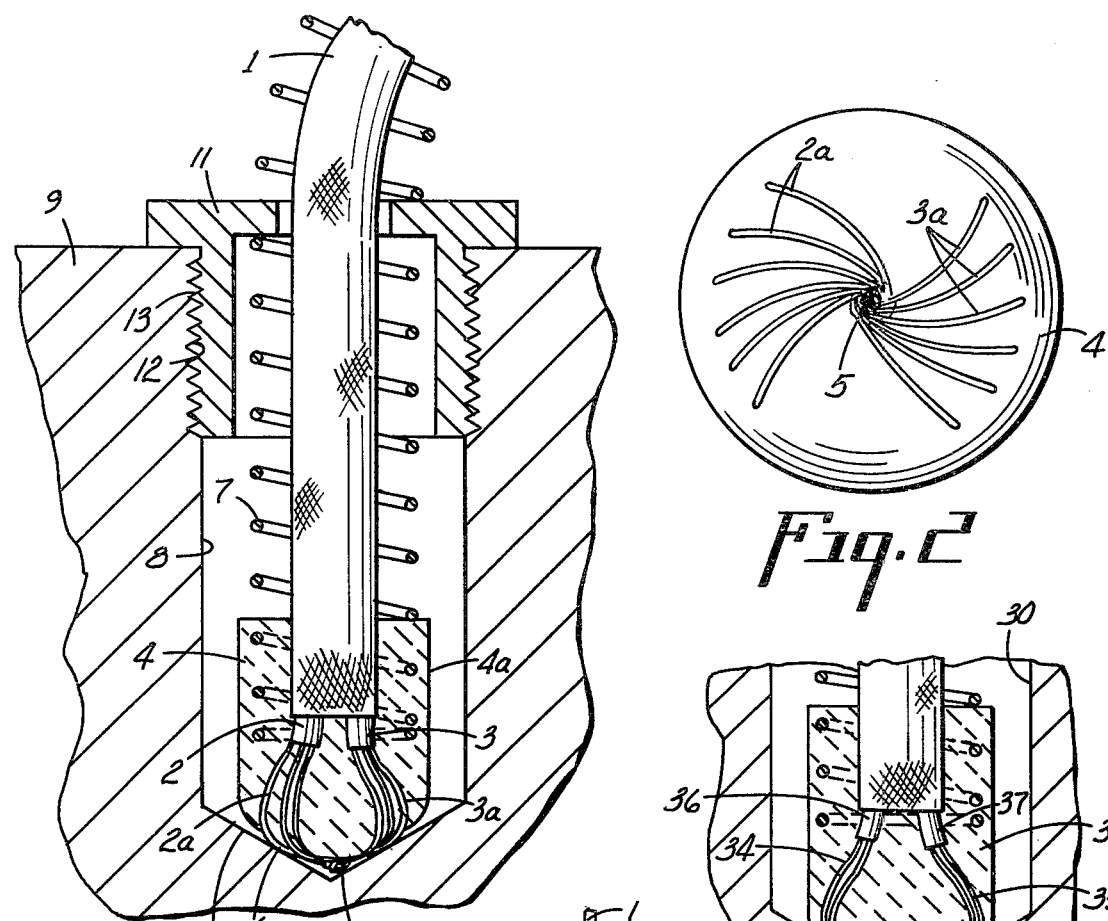
Fig. 1
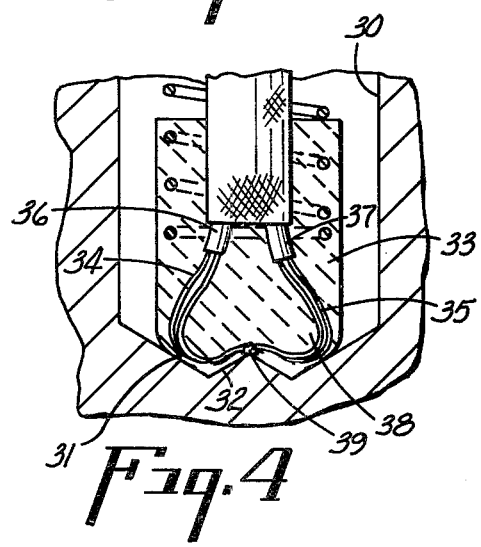
Fig. 2
Fig. 5
Fig. 4
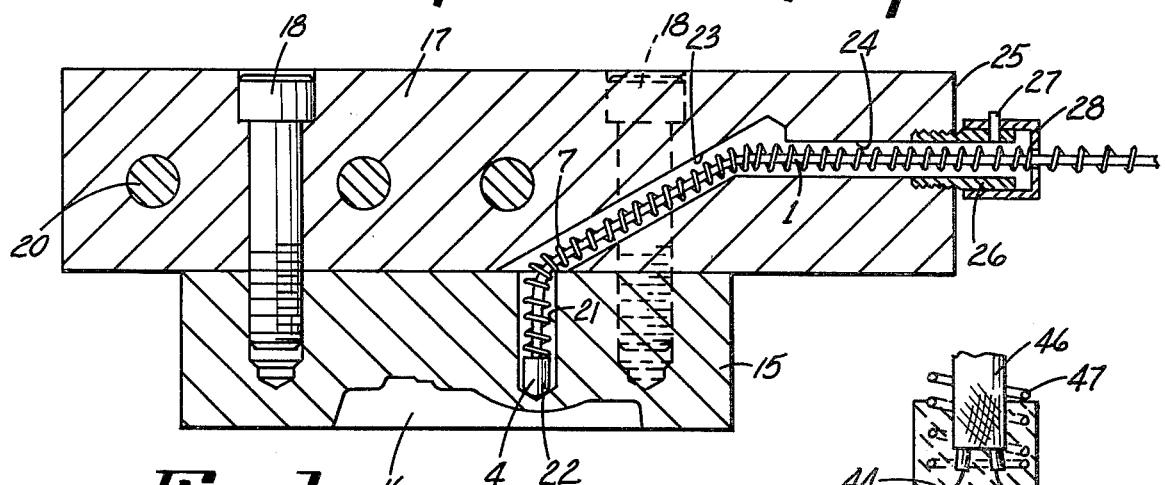
Fig. 3
Fig. 6

THERMOCOUPLE PROBE-CONSTRUCTION AND MOUNTING

OBJECTS OF THE INVENTION

It is a principal object of this invention to provide electronic thermal sensing means wherein a contact member of very low mass is provided, in which sensing elements including the conductors and/or their ends and sensing elements connected thereto, are arranged whereby rapid response to temperature changes will be assured and accurate localized indication of conditions of temperature made available.

Yet another object of the invention is to provide a contact member of the low mass referred to which makes possible the positioning of conductors at their extremities and through which a signal is transferred in such a way that pressure of the member against the surface will improve response to temperature changes because of the material and configuration of the contact member and the manner in which the pressure is applied.

It is a further object of this invention to provide thermocouple probe construction wherein the contact member of the device will be more effectively brought into contact with and maintained in contact with a surface where indication of temperature and change thereof is desired, the area over which the contact is to be affected being greater than is usually the case and the contact itself being more effectively maintained.

It is a still further object of this invention to provide a probe wherein the end thereof which comprises the contact member and by which the conductors are positioned, is molded in a plug-like shape, and the conductors extend therefrom and over the surface thereof, the contact member may be moved into narrow spaces, through confined areas and be much more inexpensively provided than has heretofore been the case, since it is a plastic member of low mass and of relatively short extent so that turns and twists of the probe member may be effected for passing to places where temperature indication is sought.

Another object of the invention is to provide a probe construction in which the end thereof, into which the conductor means extend and constituting the contact member, is of plastic material, and a spiral wound spring at its extremity is molded into the member, the spring in turn receiving therewithin the conductor means for positioning the same and to apply pressure to the end of the member by means of the spring.

Another object of the invention is to provide a construction as hereinbefore outlined, wherein a suitable part is mounted on the spring whereby positioning of the part with respect to the spring will in turn determine the extent of pressure to be applied to the spring and thus the contact member at the end against the surface from which temperature indication is to be ascertained.

A further object of the invention is to provide the construction just before described wherein rotation of the part in one direction, will effect compression of the spring and thereby increase the tension thereon during the application of the contact member to its intended position for indication purposes.

Other and further objects of the invention will be understood from the consideration of the specification appended hereto and disclosed in the drawing wherein:

FIG. 1 is an enlarged fragmentary sectional view illustrating the probe construction in accordance herewith and a position in which the same may be mounted for temperature indication purposes.

FIG. 2 is an end view of the plug-like member carrying the end of the probe and illustrating the conductors and portions thereof in a preferred arrangement.

FIG. 3 is a fragmemtary sectional view illustrating the environment and positioning of a probe constructed in accordance with this invention in position for indication purposes.

FIG. 4 is an enlarged fragmentary sectional view of the end of the probe illustrated in FIG. 3.

FIG. 5 is a fragmentary view to illustrate a part for applying pressure to the spring and thus the probe and conductors carried thereby.

FIG. 6 is a fragmentary sectional view showing a contact member in which a thermister is molded.

DESCRIPTION OF THE INVENTION

Referring now to FIG. 1, a first form of the thermal sensing probe invention hereof is shown as including a sheath member 1, through which extend the pair of conductors 2 and 3, in this instance shown as thermocouple construction, the conductors availed of being of stranded construction including the strands 2a and 3a. While stranded conductors are illustrated, it should be understood that a single conductor for each of the pair 2 and 3, may be used, as though one of the strands was arranged as will be subsequently setforth.

The strands 2a and 3a, are arranged about as shown in FIG. 1 so as to be separated, and extend outwardly through a plug-like member 4, which may be of molded thermo setting material, or potting material to encapsulate the strands if desired or other similar plastic type material to maintain the positions of the strands.

It will be observed that the member 4 is molded so as to engage with the sheath 1, and maintain the stranded elements 2a and 3a about in the positions shown, these being brought together at 5, twisted together and brazed or otherwise secured for contact purposes about as shown in FIG. 2, which is an enlarged end view as previously noted, so that the strands 2a and 3a extend over the end 6 of the member 4 and thus are in position for effecting contact with a surface against which the plug is positioned. It is emphasized that the member 4 is of very low mass and short length for purposes which will subsequently appear.

In this instance the plug-like member 4 and its associated elements, also are provided with a spiral wound spring 7, which as indicated surrounds the sheath and conductors therewithin, and is in turn molded in the member 4 so as to be fixed thereto.

Thus the member 4 and conductors 2 and 3 as well as the sheath 1, may be manipulated with the spring into a position such as is shown in FIG. 1, in this instance being a hole 8 drilled into a die block 9 for example, the hole having the usual tapered bottom surface 10 formed by a drill which would be normally availed of for such purpose.

The configuration of the end of the plug-like member 4 will preferably be substantially spherical though not limited thereto and thus the stranded elements 2a and 3a thereof will in turn come into contact with this tapered surface 10, and effect the desired contact for indication purposes.

Irrespective of the foregoing, the plug-like member 4 and its associated parts are maintained in position and under some pressure by the spring 7, which in turn is engaged with a part such as the bushing generally designated 11.

The bushing 11 is provided with threads on its exterior portion at 12 to engage with corresponding threads 13 formed in the drilled opening 8.

It will thus be seen that by suitably positioning the bushing 11, which will be designated as a pressure part, the spring 7 will apply the tension desired.

FIG. 3 discloses a particular arrangement of the probe construction hereof which is most advantageous, and in that connection it is noted that a mold or die block 15, is shown as having a cavity 16 therein, this disclosing only the upper half so to speak of said mold or die block, as being connected to a platen such as 17, of the usual molding press, by means of the bolts 18, arranged in the usual manner.

Since it is desired in the actual molding process to heat the mold or die block 15 certain heaters such as 20 may be provided, and it is desired to control the temperature in the die block as effected by operation of the heaters.

To that end therefore, the probe construction hereof is particularly suitable, and in this instance the die block 15 is provided with a hole or passage such as 21 therein, the bottom of which designated at 22, is formed by a drill in the same manner as the disclosure of FIG. 1, and this hole is in turn aligned with a hole designated 23 drilled at an angle in the platen 17, so as to be have its end opposite the hole 21 in the block 15, a further hole 24 being drilled from the side of the platen at 25, to connect with the hole 23.

As will be observed, by reason of the low mass, and short extent of the contact member 4, the probe as such may be inserted in the opening 24, and turn the corner at the juncture of the opening 24 and 23, and in turn pass downwardly into the die block 15 around the relatively sharp corner provided by the conjunction of the openings 21 and 23.

This is so, even though the spring 7 is in position with the conductors and sheath 1 likewise arranged as disclosed because of the short extent of the probe member 4, and thus the end of the probe or contact surface thereof is positioned in a manner substantially identical to that disclosed in FIG. 1.

In this instance, the probe is maintained in its position by spring tension, provided by a two part mounting member, in which a bushing-like part 26, having threaded engagement with a corresponding opening in the side of the platen 17, is to support the same, the bushing-like part 26 in turn having the bayonet coupling member 27, with a cap 28 arranged to engage such member 27 and thus apply the tension to the spring 7, because the cap 28 has threaded engagement with the spring and will be adjustable there along by reason of that arrangement.

Thus the cap 28 may be positioned along the spring, and by appropriate manipulation, the bayonet connection may be engaged to maintain the spring and thus the member 4 in its position for temperature indication purposes.

It is noted that by reason of this construction, a most desirable contact is obtained and control and sensitivity of changes in the temperature in the cavity 16 may be readily observed and further control of the heaters such as 20 by response, will be very rapid in any event.

The member 4 is of relatively short length and small mass as stated and as seen in FIG. 1 may thus be positioned in a shallow hole. Since the outer surface 4a is thus of limited length, and can be so proportioned because of its plastic or potting composition, the influence of the temperature of the member 9 above the surface 10 will be virtually eliminated and response to temperature at that surface be the principal source for indication, and localized with sensitive response thereby.

The disclosure of FIG. 4 illustrates another form of the invention where the bottom of a hole 30 formed by deep hole drilling may have the double surface form 31, 32, and it is desired to sense and indicate temperature thereat, whether by the thermocouple elements just described or thermister circuit means to be subsequently referred to herein.

In this instance the corresponding end of a member such as 33 will be similarily configured, and if for example it is desired to maintain contact of the surface of the member 33 but not the actual strands 34 and 35 of the conductors 36 and 37 respectively, the said ends of the strands 34 and 35 may be molded below the surface of the end 38 of the plug-like member 33.

The strands are twisted together at 39 and brazed or otherwise secured in contact before the molding or encapsulating action is undertaken, so that ultimately the strands whether there by more than one or not, are just below the surface as suggested.

In this instance indication of temperature changes will be very rapid in any event even though direct contact of the strands or conductors themselves is not effected with the surfaces such as 31 and 32. p The desirability of having the plug member or contact member 33 maintained in engagement with the surfaces 31, 32 for example is still applicable since the temperature indication will be almost as rapid as though direct contact of the conductors themselves was obtained particularly when it is born in mind that the material from which the contact members 4 and 33 are formed is of plastic composition.

It is additionally noted that in the event it is desired to use a different construction of probe member, as long as the mass of the member 4 or 33 as the case may be is maintained as small as possible to at the same time properly position the conductors engaged therewith or extending there through, the concept hereof will be accomplished since manipulation of the probe and its associated elements into small or tight places will be readily accomplished in contrast to known probe or contact members, which have usually been of metal, have been constructed in ways in which the mass has been minimized but not of plastic and not arranged to use in either encapsulating means or molding processes.

By arranging the spring 7 so that it is wound, in one hand, for example left hand in contrast to the usual right hand thread of threads 13 on bushing 11, if the bushing 11 is thereafter screwed in place in the hole 8, the spring 7 by reason of being wound left hand, will be compressed whereby effective pressure on the contact part or member is provided.

This is so, as long as the inter-engagement of the bushing and spring is such as to provide for right hand rotation of the bushing, moving the bushing along the spring oppositely thereto.

It is also noted that in construction such as that shown in FIG. 3, where a cap 28 is provided, a similar condition will exist and a slightly different tensioning of the spring will result, or it may be even that the spring can be wound in the same hand, and the cap still be effective to apply the tension although not precisely positioned.

It should be additionally pointed out that whereas the end of the contact member 4 has been shown as being substantially spherical or of similar shape, it could be flat as long as the contact is such as to be effective or if the conductors are embedded below the surface of the end of a member such as 4 or 33.

It should also be noted that the ability to mold the conductors into a plug or contact member, in the manner and with the construction shown, will greatly facilitate miniaturization of such contact arrangements and thus of electronic thermal sensing probes in general where such miniaturization is particularly desirable or necessary.

The disclosure of FIG. 6 is that of a contact member such as the plug-like member 42 in which a thermister 43 is encapsulated, the conductors 44 and 45, extending from the sheath 46 and the end of the spring 47, molded into the member 42, although it could merely bear against the shoulder 48 instead of being encapsulated therein.

The desirable attributes set forth heretofore are maintained and enhanced by this construction, the thermister being insulated from direct contact with the surface to which the member 42 is applied, the low mass of such member and the position of the thermister therein providing the desired sensitive response.

Where electrical insulation of the sensing means is desired the disclosure of FIG. 6 will suggest a most suitable way to effect the same.

The fact that the members 4, 33 and 42 are of low mass and can be made by molding or encapsulating or other means so long as the basic concept is maintained, is important to attaining the results heretofore described.

Further, the ability to incorporate the sensing means in a plug-like member of this nature, makes possible what may be termed the shortest possible immersion installation of such means without adversely affecting sensitivity, the fact that the spring is virtually insulated from the sensing surface likewise being of advantage.

Virtually the only limitation to miniaturization if desired, is the ability to manipulate the various elements which comprise the combination and where the spring is availed of the ability to make a spring small enough to be arranged as setforth may be the only limitation.

I claim:

1. In probe construction, in combination, a low mass contact member of insulating material, sensing means including conductors extending to positions near the surface of the member which contacts the surface of the member whose temperature is to be measured, said conductors being encapsulated at least partially therein, and means to apply pressure to the member to assure contact thereof at the free end extremity of said member with the separate member of which temperature indication is desired.

2. The combination as claimed in claim 1, wherein a pair of conductors is molded in the member with at least a portion of the extremity of each conductor extending along the contact surface of the end of the contact member, whereby those portions can be held in position for quick response to temperatures of a substantial area of a surface of the said separate member.

3. The combination as claimed in claim 2, wherein the extremities of the conductors are of multi-stranded construction, said strands being arranged with portions of the extremities extending along the said end whereby more than one of said strands of each conductor will be held in position for quick response to temperatures of the separate surface area aforesaid, when the means to maintain the position are operable therefore.

4. The combination as claimed in claim 1, wherein a coil spring surrounds the conductors, the end of the spring is molded in the plug-like member likewise, and the means to maintain the position are arranged to compress the spring.

5.

The combination as claimed in claim 4, wherein the means to maintain the position include a part having screw engagement with the spring whereby to move there along when said part is rotated, and by engagement with a mating part, retain the spring in compressed condition and thereby exert pressure on the member against the said separate surface.

6. The combination as claimed in claim 4, wherein the means to apply the pressure comprise a part having internal screw engagement with the spring wound in one hand and external screw engagement with mating threads of the opposite hand at the entrance of a hole in which the plug-like member is seated with the conductors in position with respect to a surface of an element of which temperature indication is desired, rotation of said part to tighten the same in the entrance aforesaid, effecting compression of the spring and thereby effecting increased contact pressure of the member against the said surface.

7. The combination as claimed in claim 4, wherein the means to maintain the position comprise a part having internal screw engagement with the spring and external screw engagement with the mating threads at the entrance of a hole in which the plug-like member is seated, with the conductors in position with respect to a surface of an element of which temperature indication is desired, rotation of said part to tighten the same in the entrance aforesaid, effecting compression of the spring and thereby effecting increased contact pressure of the member against the said surface.

* * * * *